May 8, 1956   M. M. ROSS   2,744,436
FASTENER WITH PIVOTED ROD ENGAGING DOGS
Filed March 23, 1953
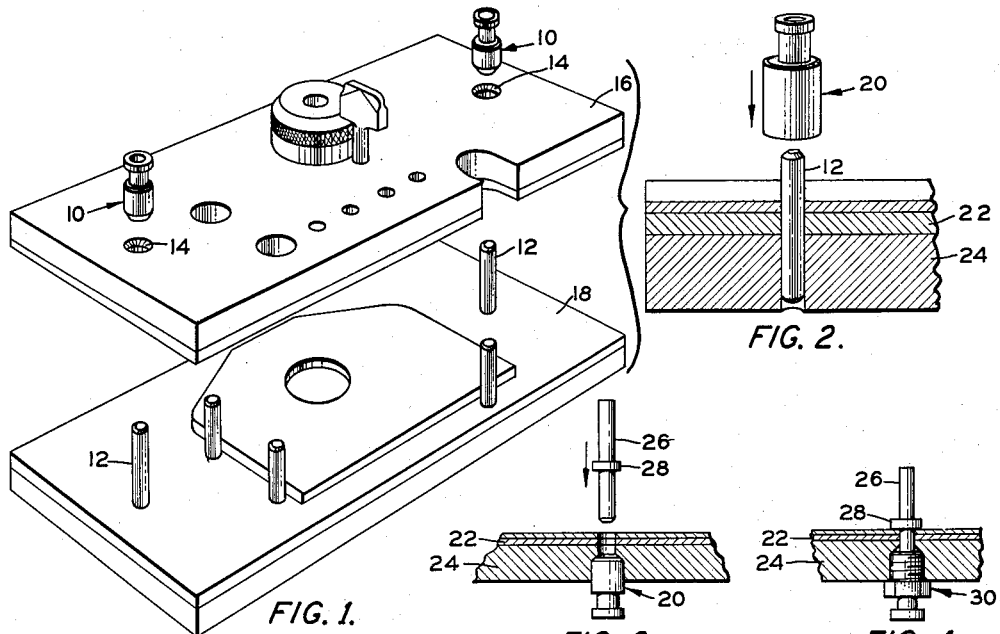
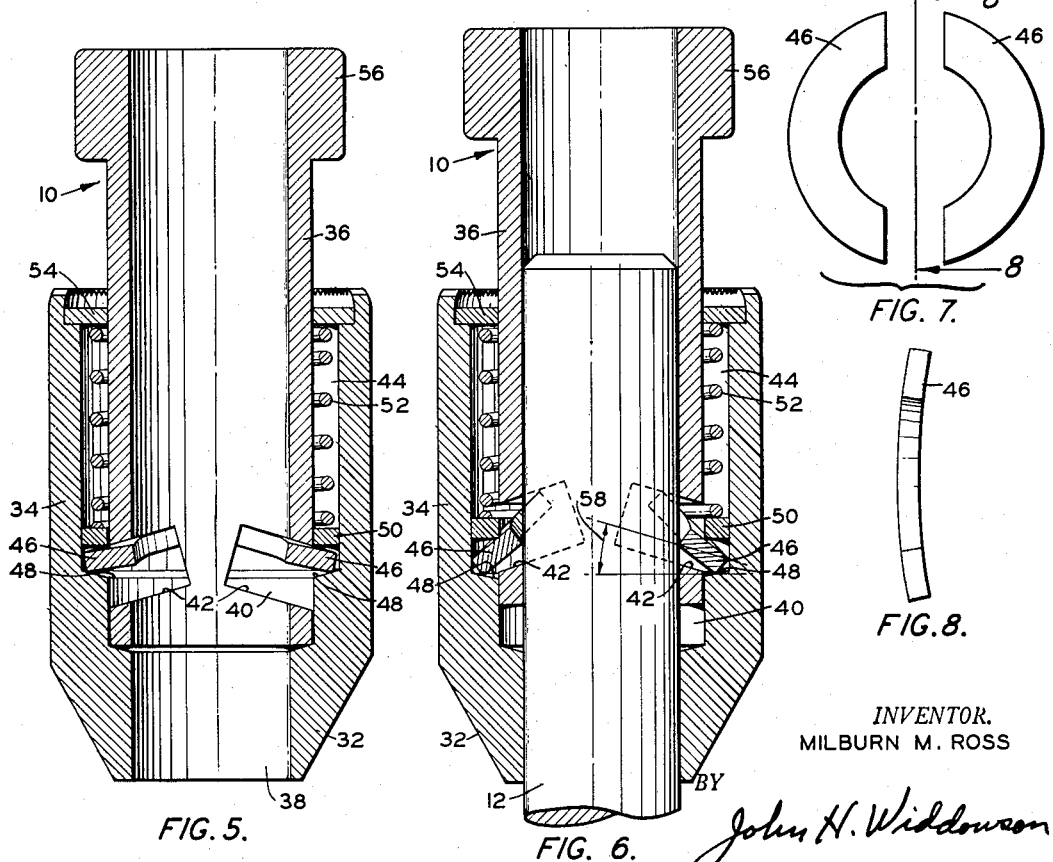
INVENTOR.
MILBURN M. ROSS
BY John H. Widdowson
ATTORNEY

United States Patent Office 2,744,436
Patented May 8, 1956

2,744,436

FASTENER WITH PIVOTED ROD ENGAGING DOGS

Milburn M. Ross, Wichita, Kans.

Application March 23, 1953, Serial No. 344,037

2 Claims. (Cl. 85—36)

This invention relates to lock means. In a more specific aspect this invention relates to means for locking material which is mounted on a pin member in place. In a still more specific aspect this invention relates to a locking device for mounting on a tooling pin to retain material mounted on the tooling pin in a jig.

In devices for holding the work in a machine tool, usually referred to as jigs, especially devices for accurately guiding a drill or a group of drills so as to insure uniformity in successive pieces machined, it has been the practice to hold the upper and lower portions of the jig together with clamps, usually separate clamps or clamps mounted on the lower portion or frame of the jig. Also, it has been common practice to clamp the work to a jig frame, using separate clamps or clamps mounted on the jig frame. While jigs using or having clamps therewith to hold the work have been successful to accomplish the results desired, there are certain disadvantages to same. Extra construction time is used in the jig shop in building the clamps into the jig or providing for clamp means. Extra jig materials are used to provide for mounting the clamping means. Jig loading and unloading time in production is used up in releasing clamps and moving them out of the way so that the jig can be disassembled and the work removed therefrom. Additional work is necessary to load and unload the jig due to the clamp means used.

I have invented lock means which can be used with a pin member, particularly advantageously with a tooling pin used with a jig to hold the jig parts together or to hold material to be worked on the jig frame. The lock means of my invention comprises an outer member with an inner member slidably mounted therein. The inner member has a hole therethrough to receive a pin member, for instance a tooling pin used with a jig. The inner member has a transverse slot through its wall in which is mounted a relatively long curved dog. Spring means are mounted in said outer member and are adapted to exert force to retract said inner member and to force the dog inwardly so as to grip a pin member used in the inner member. The inner and outer members are adapted on extension to tilt the dog outwardly thus releasing the lock means from the pin member. The locking device of my invention is very convenient to use with a tooling pin to hold work in a jig, either to hold work mounted on tooling pins which are mounted on a jig, or work which is held between parts of a jig which are positioned and mounted together by tooling pins, for example a drill plate mounted on a jig frame by the use of tooling pins. I have found that the lock means of my invention are easy to use, very reliable, long lasting and economical to make. Many advantages are realized through the use of the lock means of my invention. Construction time in the jig shop is saved. Fewer materials are used in constructing the jig. Less loading and unloading time is used in production, and much less effort is expended in loading and unloading the jig than with the usual type of jig employing clamp means. I have found the lock means of my invention to be very strong and giving no back-lash or slipping even after much use. Even severe jarring and vibration of the jig has been found not to loosen the lock means of my invention when in use.

It is an object of this invention to provide lock means.

It is another object of this invention to provide means for locking material mounted on a pin member in position.

It is still a further object of this invention to provide lock means for mounting on a tooling pin to hold parts of a jig together or to hold materials mounted on tooling pins on a jig.

Other objects and advantages of the lock means of my invention will become apparent to one skilled in the art upon reading this disclosure.

Drawings accompany and are a part of this disclosure. Such drawings depict preferred specific embodiments of the lock means of my invention. However, it is to be understood that such drawings are not to unduly limit the scope of my invention.

In the drawings, Fig. 1 is a perspective, exploded view of a jig having a drill plate mountable on tooling pins on which a preferred specific embodiment of the lock means of my invention, having beveled ends for use in countersunk oversized positioning holes, are mounted to lock the jig in position for drilling the work.

Fig. 2 is a view showing another preferred specific embodiment of the lock means of my invention having a substantially flat end, particularly adapted for mounting on a tooling pin to lock material mounted on the tooling pin in position on a jig frame.

Fig. 3 is a view showing a preferred method of using the lock means of my invention with a tooling pin having a flange for use with the lock means of my invention mounted on the underneath side of a jig frame.

Fig. 4 is a view showing a preferred specific embodiment of the lock means of my invention threadedly secured to a jig frame for use with a tooling pin having an engaging flange.

Fig. 5 is a longitudinal cross-sectional view of a preferred specific embodiment of the lock means of my invention.

Fig. 6 is a longitudinal cross-sectional view of the lock means of my invention shown in Fig. 5 with a tooling pin inserted therein, such view showing the lock means in a locked position.

Fig. 7 is a plan view of a preferred specific embodiment of dogs used in the lock means of my invention.

Fig. 8 is a view taken on line 8—8 of Fig. 7.

The following is a discussion and description of preferred specific embodiments of the lock means of my invention with reference to the drawings. The same reference numerals are used on the figures of the drawings to indicate the same or similar apparatus and/or structure. It is to be understood that such discussion and description is not to unduly limit the scope of my invention.

Lock means 10 of my invention has beveled end portions to receive tooling pins 12. This specific embodiment of the lock means of my invention is particularly advantageously used with countersunk oversized positioning holes 14 in a drill plate 16. Drill plate 16 is easy to remove from jig frame 18 using such oversized positioning holes and my beveled lock means. Drill plate 16 fits down on jig frame 18 with tooling pins 12 through holes 14. Lock means 10 are mounted on tooling pins 12 while holding the lock by its lower portion and pushing same down on pin 12 until the beveled portion of lock 10 is seated in the countersunk oversized positioning hole 14. The work is thus held firmly in position between drill plate 16 and jig frame 18. The jig stays locked until locks 10 are removed by grasping them by the upper portion and pulling them from pins 12. Thus, as one skilled in the art can readily see, no clamp means are used to hold members 16 and 18 together, and no projections of 18 are needed on which to mount the usual clamp means.

In Fig. 2 a typical use of another preferred specific embodiment of the lock means of my invention is depicted. Lock means 20 has a substantially flat end through which tooling pin 12 passes. This has been found desirable in installations wherein material to be worked is mounted on tooling pin 12 which is in turn mounted on jig frame 24. Lock means 20 is mounted on tooling pin 12 by grasping the lower portion with the fingers and pushing lock 20 down on pin 12 as far as possible. Material 22 will then be locked in the jig and will remain so until lock means 20 is moved by grasping the upper portion and pulling same upwardly to remove lock 20 from pin 12.

In Figs. 3 and 4 other specific embodiments and uses of the lock means of my invention are shown. In Fig. 3 lock means 20 is mounted in a countersunk hole on the underneath side of jig frame 24 and a tooling pin 26 having a flange 28 is inserted therein by passing same downwardly through material 22 as far as possible, the flange contacting to hold material 22 in place. While inserting pin 26, lock 20 is held in jig frame 24 by grasping the portion of lock 20 in the hole in frame 24 with the fingers. The material to be worked 22 will remain locked in the jig until pin 26 is removed which can only be accomplished by pulling upwardly on pin 26 while holding the lower flanged portion of lock 20, or lock 20 can be removed from frame 24 by grasping the flange portion of lock 20 and pulling downwardly. If it is desired, the portion of the lock means in the jig frame can be threaded for threadedly securing the lock means in frame 24, as shown by lock means 30 in Fig. 4. This has its advantages, since the lock means does not have to be held in the jig frame while inserting pin 26 therein.

Fig. 5 is a longitudinal cross-sectional view through a preferred specific embodiment of the lock means of my invention, and Fig. 6 shows same with tooling pin 12 inserted therein in locked position. The preferred inner structure shown is that preferred for each of lock means 10, 20 and 30 shown in the various figures of the drawings. The lock means shown in Figs. 5 and 6 with regard to outer structure is that of lock means 10 having a beveled end portion 32, one preferred use of which is shown in Fig. 1. Lock means 10 has an outer portion 34 and an inner portion 36 telescopically mounted therein. Outer member 34 has a hole therethrough, a first portion 38 of which preferably snugly receives tooling pin 12. A continuing portion 40 of the hole through member 34 preferably snugly receives the lower end portion of inner member 36. Transverse slots 42 are formed in inner member 36 in the lower portion thereof, the opening of the slots 42 overlapping the junction of portion 40 of the hole through member 34 and a continuing portion 44 of such hole. Dogs 46 are mounted in slots 42 with the outer portions of dogs 46 contacting shoulder 48 of member 34 at the junction of portions 40 and 44 of the hole through member 34. I have found it desirable to use a pair of oppositely disposed dogs 46 mounted in transverse slots 42. However, in some cases a single slot 42 and dog 46 can be used, or if more gripping contact is desired, more than two slots with dogs therein can be used or a plurality of dogs can be used in each of the slots. Ring or washer member 50 is mounted around inner member 36. Ring member 50 is free to move as forced in the annular space between members 36 and 34, and is preferably in contact with dogs 46 at all times as a result of the force exerted thereon by spring means 52 mounted around inner member 36, such spring means being preferably a spiral spring as shown. Ring 54 is mounted around inner member 36 inside outer member 34 as shown and is held in place therein preferably by knurling the edge of member 34 as shown. Other holding means can be used if desired. Rings or washers 50 and 54 can be omitted, if desired, that is, spring 52 can be directly in contact with dogs 46 and the upper end portion of member 34. However, in construction of the lock means, I have found it more economical to use washers 50 and 54 because a spiral spring less exacting as to machining can be used. It has been found more economical to use washer 54 than to roll the top edge of member 34 to exacting enough finish, to guide inner member 36 therethrough in sufficient alignment to in turn guide tooling pin 12 into member 36 from the end portion 38 of the hole through member 34. Spiral spring 52 need only be strong enough and in compression enough to exert sufficient force to urge dogs 46 inwardly against tooling pin 12. Spring 52 exerts force to keep the lock means retracted. Inner member 36 has a raised portion 56 on the end thereof, which is grasped with the fingers and pulled to remove lock means 10 from tooling pin 12. Upon pulling on member 36 the lower portions of slots 42 contact dogs 46 tilting them away from in contact with tooling pin 12. Any suitable grasping means on the outer end of member 36 can be used.

Dogs 46 are preferably curved or arcuate in length as shown in Fig. 7 and concavo-convex as shown in Fig. 8, and as shown in Figs. 5 and 6, they are preferably mounted in slots 42 with the convex side toward beveled end portion 32 of member 34. Dogs 46 can be mounted in slots 42 with the convex side away from end portion 32, if desired. However, mounting as shown has been found to be desirable, because such allows for minimum travel upon insertion of tooling pin 12 into the lock means before the lock is in locked position on the pin. This has been found to allow for maximum working of the tooling pin. The dogs 46 as shown have been found to give especially good results and providing for lock means which are very strong to resist removal of the lock means from the tooling pin upon exertion of force on member 34 caused by vibrations or jarring of a jig, and increasing the force exerted on member 34 to remove the lock means from pin 12 increases the force exerted on the pin through dogs 46 to retain the lock means in position on the pin. The arcuate in length and concavo-convex shape of the dog of the lock means of my invention gives great contact with the tooling pin, and such a dog shape has been found to resist great pressure without the lock means moving in the least. No back-lash is experienced in using the lock means of my invention, since the dogs are always in locking position against the tooling pin 12 as it is inserted into member 36 from member 34. I have found it preferable to design the dogs 46 for the lock means of my invention to fit various sizes of tooling pins so that the arcuacy in length and the concavo-convexness of the dogs are such that the edge of the dog is in contact with the tooling pin throughout the length of the dog. Also, I have found it desirable and preferable that the angle 58, an angle between a line at right angles to the longitudinal axis of tooling pin 12 and a line diagonally through dogs 46 from center point of contact with said tooling pin, as shown, be in the range of a small fraction of a degree to 25 degrees, more preferably in the range of 5 to 20 degrees.

Lock means 10 is mounted on tooling pin 12 by grasping lock 10 with the fingers by portion 34 and shoving the assembly down onto pin 12. Lock means 10 remains on tooling pin 12 at any desired point with dogs 46 in contact with the sides of tooling pin 12. To remove lock means 10 from tooling pin 12, member 36 is grasped by flange 56 with the fingers and pulled. The lower portion of slots 42 are raised against the force of spring 52, and such lower portions of the slots contact dogs 46 which are tilted outwardly from in contact with tooling pin 12. Force exerted on tooling pin 12 while grasping flange 56 will, of course, release lock means 10 from pin 12. If desired, for example in uses such as those shown in Figs. 3 and 4, inner member 36 can be closed, that is, the hole therein not passing all the way through. The pin member 26 in this case is hollow, preferably tubular, and the release of the lock means is accomplished by exerting force on the inner member 36 to extend the lock means with a wire or shaft passed through the hollow pin member. This type of assembly is desirable in many cases, particularly if space is limited.

While the lock means of my invention has been described particularly specifically in relation to use with tooling pins and jigs, it is to be understood that they can be used with any pin member to hold material thereon in a locked position, for example pin members holding concrete form members together, pins mounted on walls used for hanging articles, and the like, and as will be evident to those skilled in the art, various modifications of my invention can be made or followed in the light of this disclosure and discussion, without departing from the spirit or scope of the disclosure or from the scope of the claims.

I claim:

1. Lock means for use in conjunction with a tooling pin to retain material to be worked in a jig, which comprises, in combination: an outer member adapted in one end portion to engage a jig member and with a hole therethrough, said hole having an end portion A of constant diameter of such size to snugly receive a tooling pin, a continuing portion B of constant diameter greater than said diameter of said portion A and a continuing portion C of constant diameter greater than said diameter of said portion B; an inner member having a hole therethrough telescopically and snugly mounted in said portion B, said inner member being too large to fit into said portion A, having a pair of oppositely disposed transverse slots communicating with said hole through the walls thereof at a point in said inner member so that when said lock means is fully retracted said slot openings overlap the junction of said portions B and C, and said inner member being adapted to and said hole therein being of such size to snugly receive said tooling pin passed therein from said portion A; a dog in each of said slots, said dogs being narrow in radial length and less than the distance from said pin when inserted to the inner wall of said portion C, arcuate in circumferential length, concavo-convex, blunt on their inner edge, and mounted with said convex side toward said portion A, projecting into said hole in said inner member, tiltably mounted to allow passage of said tooling pin therebetween, pivotally engaged in their outer portions with said outer member at point of junction between said portions B and C and being adapted on extension of said lock means to be tilted outwardly by the face of said slots on said portion B side of said hole in said outer member; a first flat ring slidably mounted around said inner member in the annular space between said inner member and said portion C, said ring being in contact with the sides of said dogs away from said portion B; a spiral spring mounted around said inner member in said portion C in contact on one end with said first ring and adapted to exert force on said dogs to continually urge same inwardly against a tooling pin to grip said pin and to keep said lock means retracted; a second flat ring mounted in said outer member and around said inner member, said second ring in contact with the other end of said spring, means incorporated in said outer member to hold said second ring in said outer member; and a flange on the outer end portion of said inner member adapted for gripping said inner member to extend said lock means to release same from a tooling pin therein.

2. Lock means for use with an elongated cylindrical pin member, which comprises, in combination: an outer member having a substantially round hole therethrough, said hole having an end portion A of size to snugly receive said pin member, a continuing portion B having a greater diameter than that of said portion A and a continuing portion C having a greater diameter than that of said portion B; an inner member having a hole therethrough telescopically and snugly mounted in said portion B, said inner member being too large to fit into said portion A, having a pair of oppositely disposed transverse slots communicating with said hole through the walls thereof at a point in said inner member so that when said lock means is fully retracted said slot openings overlap the junction of said portions B and C, and said inner member being adapted to and said hole therein being of such size to snugly receive said pin member passed therein from said portion A; a dog in each of said slots, said dogs being narrow in radial length and less than the distance from said pin when inserted to the inner wall of said portion C, arcuate in circumferential length, concavo-convex, blunt on their inner edge, and mounted with said convex side toward said portion A, projecting into said hole in said inner member, tiltably mounted to allow passage of said pin member therebetween, pivotally engaged in their outer portions with said outer member at point of junction between said portions B and C and being adapted on extension of said lock means to be tilted outwardly by the face of said slots on said portion B side of said hole in said outer member; resilient means mounted in the annular space between said inner member and said portion C, said resilient means being adapted to exert force on both of said dogs to continually urge same inwardly against said pin member to grip same when inserted and to keep said lock means retracted; and means with the outer portion of said inner member adapted for gripping said inner member to extend said lock means to release same from said pin member therein.

References Cited in the file of this patent

UNITED STATES PATENTS

| 836,739 | Dawson | Nov. 27, 1906 |
| 1,031,637 | Fischer | July 2, 1912 |
| 1,069,451 | Marston | Aug. 5, 1913 |
| 1,454,857 | Phinney | May 15, 1923 |
| 2,486,663 | Lovejoy | Nov. 1, 1949 |

FOREIGN PATENTS

| 462,178 | France | Nov. 15, 1913 |